(12) United States Patent
Kim et al.

(10) Patent No.: US 11,325,444 B2
(45) Date of Patent: May 10, 2022

(54) HEAT PUMP SYSTEM FOR VEHICLE

(71) Applicants: Hyundai Motor Company, Seoul (KR); Kia Motors Corporation, Seoul (KR)

(72) Inventors: Jae Yeon Kim, Hwaseong-si (KR); Yeon Ho Kim, Seoul (KR); Jeawan Kim, Gwangmyeong-si (KR); Wan Je Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 16/668,624

(22) Filed: Oct. 30, 2019

(65) Prior Publication Data
US 2020/0398641 A1 Dec. 24, 2020

(30) Foreign Application Priority Data
Jun. 24, 2019 (KR) .................. 10-2019-0074988

(51) Int. Cl.
*B60H 1/00* (2006.01)
*B60H 1/32* (2006.01)
*B60H 1/14* (2006.01)

(52) U.S. Cl.
CPC ..... *B60H 1/00907* (2013.01); *B60H 1/00007* (2013.01); *B60H 1/00278* (2013.01); *B60H 1/00385* (2013.01); *B60H 1/00428* (2013.01); *B60H 1/00899* (2013.01); *B60H 1/00921* (2013.01); *B60H 1/143* (2013.01); *B60H 1/3227* (2013.01); *B60H 2001/003* (2013.01); *B60H 2001/00307* (2013.01);
(Continued)

(58) Field of Classification Search
CPC ............ B60H 1/00007; B60H 1/00278; B60H 1/00385; B60H 1/00428; B60H 1/00899; B60H 1/00921; B60H 1/143; B60H 1/3227; B60H 2001/003; B60H 2001/00307; B60H 2001/00949; B60H 2001/00928; B60H 1/3228; B60H 2001/00957; B60H 1/00907; B60H 1/00392; B60H 1/004; B60H 1/3213; B60K 1/00; B60K 2001/005; Y02T 10/70
See application file for complete search history.

(56) References Cited

U.S. PATENT DOCUMENTS 5,641,016 A * 6/1997 Isaji ................... B60H 1/00921
165/43
8,215,432 B2 7/2012 Nemesh et al.
8,899,062 B2 12/2014 Kadle et al.
(Continued)

FOREIGN PATENT DOCUMENTS

CN 103380339 B 1/2016
JP 5336033 B2 11/2013

*Primary Examiner* — Ljiljana V. Ciric
(74) *Attorney, Agent, or Firm* — Morgan, Lewis & Bockius LLP

(57) ABSTRACT

A heat pump system for a vehicle utilizes one chiller in which the coolant and the refrigerant are heat-exchanged to heat or cool a battery module. In addition, the heating efficiency is improved by selectively using the external heat and the waste heat of the electrical component and the battery module in the heating mode of the vehicle, wherein the electrical component is mounted on the coolant line connected to on the cooling apparatus of the heat pump system.

20 Claims, 8 Drawing Sheets

(52) U.S. Cl.
CPC .............. *B60H 2001/00928* (2013.01); *B60H 2001/00949* (2013.01); *B60H 2001/00957* (2013.01); *Y02T 10/70* (2013.01)

(56) References Cited

U.S. PATENT DOCUMENTS

| | | | | |
|---|---|---|---|---|
| 9,109,840 | B2 | 8/2015 | Kadle et al. | |
| 9,239,193 | B2* | 1/2016 | Kadle | B60H 1/00342 |
| 9,511,645 | B2* | 12/2016 | Johnston | B60H 1/32284 |
| 9,517,677 | B2* | 12/2016 | Tokuda | B60H 1/00007 |
| 11,110,772 | B2* | 9/2021 | Oh | B60H 1/32284 |
| 2013/0283838 | A1 | 10/2013 | Kadle et al. | |
| 2017/0358833 | A1* | 12/2017 | Jalilevand | B60H 1/00885 |
| 2017/0361677 | A1* | 12/2017 | Kim | H01M 10/613 |
| 2018/0001784 | A1* | 1/2018 | Porras | B60L 58/26 |
| 2018/0072130 | A1* | 3/2018 | Kim | B60H 1/32281 |
| 2018/0111443 | A1* | 4/2018 | Kim | B60H 1/00485 |
| 2018/0117985 | A1* | 5/2018 | Kim | B60H 3/024 |
| 2018/0117986 | A1* | 5/2018 | Kim | B60K 1/04 |
| 2018/0215231 | A1* | 8/2018 | Porras | B60H 1/00885 |
| 2018/0251011 | A1* | 9/2018 | Sugimura | B60H 1/32284 |
| 2018/0264913 | A1* | 9/2018 | Enomoto | B60H 1/32284 |
| 2018/0281562 | A1* | 10/2018 | Spies | B60H 1/00899 |
| 2018/0312035 | A1* | 11/2018 | Koberstein | B60H 1/00899 |
| 2019/0039434 | A1* | 2/2019 | Wallace | B60W 10/30 |
| 2019/0061470 | A1* | 2/2019 | Koberstein | B60H 1/00392 |
| 2019/0070924 | A1* | 3/2019 | Mancini | B60H 1/00564 |
| 2019/0118610 | A1* | 4/2019 | Johnston | B60L 58/26 |
| 2019/0135071 | A1* | 5/2019 | Hwang | B60H 1/00571 |
| 2019/0135075 | A1* | 5/2019 | Hwang | B60H 1/00278 |
| 2019/0225050 | A1* | 7/2019 | Kang | F25B 41/20 |
| 2019/0225051 | A1* | 7/2019 | Zenner | B60H 1/00835 |
| 2019/0225052 | A1* | 7/2019 | Zenner | B60H 1/00835 |
| 2019/0241093 | A1* | 8/2019 | Shimauchi | H01M 10/6563 |
| 2019/0351732 | A1* | 11/2019 | Rajaie | B60H 1/3227 |
| 2019/0366800 | A1* | 12/2019 | Durrani | B60H 1/004 |
| 2019/0381857 | A1* | 12/2019 | Lee | B60H 1/00278 |
| 2020/0031194 | A1* | 1/2020 | Lee | B60H 1/00278 |
| 2020/0047591 | A1* | 2/2020 | He | B60H 1/32284 |
| 2020/0101810 | A1* | 4/2020 | Takagi | B60H 1/00028 |
| 2020/0101814 | A1* | 4/2020 | Takagi | B60H 1/00914 |
| 2020/0101816 | A1* | 4/2020 | Takagi | B60H 1/32 |
| 2020/0122545 | A1* | 4/2020 | Lee | B60H 1/00278 |
| 2020/0171917 | A1* | 6/2020 | Kim | B60H 1/3227 |
| 2020/0180390 | A1* | 6/2020 | Kim | B60H 1/00921 |
| 2020/0180391 | A1* | 6/2020 | Kim | B60H 1/00921 |
| 2020/0220236 | A1* | 7/2020 | Durrani | H01M 10/635 |
| 2020/0247212 | A1* | 8/2020 | Bara | B60H 1/10 |
| 2020/0346520 | A1* | 11/2020 | Ishizeki | B60H 1/00921 |
| 2020/0361275 | A1* | 11/2020 | Hwang | B60H 1/3213 |
| 2020/0369108 | A1* | 11/2020 | Kim | B60H 1/00428 |
| 2020/0384827 | A1* | 12/2020 | Oh | B60H 1/00428 |
| 2020/0391570 | A1* | 12/2020 | Lee | B60H 1/00278 |
| 2020/0398641 | A1* | 12/2020 | Kim | B60H 1/00007 |
| 2020/0398642 | A1* | 12/2020 | Kim | B60H 1/00885 |
| 2021/0001688 | A1* | 1/2021 | Kim | B60H 1/00278 |
| 2021/0016625 | A1* | 1/2021 | Lee | H05K 7/20 |
| 2021/0053412 | A1* | 2/2021 | Kim | B60H 1/00392 |
| 2021/0061067 | A1* | 3/2021 | Kim | B60H 1/00921 |
| 2021/0129627 | A1* | 5/2021 | Kim | B60H 1/143 |
| 2021/0138867 | A1* | 5/2021 | Kim | B60H 1/143 |
| 2021/0245571 | A1* | 8/2021 | Hwang | B60H 1/00878 |
| 2021/0245572 | A1* | 8/2021 | Hwang | B60H 1/323 |
| 2021/0252942 | A1* | 8/2021 | Jeong | B60H 1/00907 |
| 2021/0278113 | A1* | 9/2021 | Ryu | B60H 1/00899 |
| 2021/0291622 | A1* | 9/2021 | Durrani | B60H 1/00921 |
| 2021/0300147 | A1* | 9/2021 | Sakamoto | B60H 1/32284 |
| 2021/0331554 | A1* | 10/2021 | Mancini | B60H 1/00921 |
| 2021/0370747 | A1* | 12/2021 | Lee | B60H 1/00278 |
| 2021/0379960 | A1* | 12/2021 | Kim | B60H 1/32284 |
| 2021/0379962 | A1* | 12/2021 | Kim | B60H 1/005 |
| 2021/0387505 | A1* | 12/2021 | Kim | B60H 1/00278 |
| 2022/0001717 | A1* | 1/2022 | Kim | B60H 1/00278 |
| 2022/0009309 | A1* | 1/2022 | Miura | B60H 1/22 |
| 2022/0011006 | A1* | 1/2022 | Miura | F25B 5/02 |

* cited by examiner

HEAT PUMP SYSTEM FOR VEHICLE

CROSS-REFERENCE TO RELATED APPLICATION

The present application claims priority to Korean Patent Application No. 10-2019-0074988 filed on Jun. 24, 2019, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle for heating or cooling a battery module by use of one chiller in which a refrigerant and a coolant are heat-exchanged, for improving heating efficiency by use of waste heat of an electrical component and a battery module.

Description of Related Art

An air conditioning system for a vehicle includes an air conditioning device circulating a refrigerant to heat or cool an interior of the vehicle.

The air conditioning device, which is to maintain the interior of the vehicle at an appropriate temperature regardless of a change in an external temperature to maintain a comfortable internal environment, is configured to heat or cool the interior of the vehicle through heat exchange by an evaporator in a process in which a refrigerant discharged by driving of a compressor is circulated to the compressor through a condenser, a receiver drier, an expansion valve, and the evaporator.

That is, the air conditioning device lowers a temperature and a humidity of the internal by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Recently, as interest in energy efficiency and an environmental contamination problem are increased day by day, there is a demand for developing an environmentally friendly vehicle which is configured for substantially replacing an internal combustion engine vehicle, and the environmentally friendly vehicle is commonly divided into an electric vehicle which is driven by use of a fuel cell or electricity as a power source and a hybrid vehicle which is driven by use of an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is known as a heat pump system.

Meanwhile, the electric vehicle generates driving force by converting chemical reaction energy between oxygen and hydrogen into electrical energy. In the present process, thermal energy is generated by a chemical reaction in a fuel cell. Therefore, it is necessary in securing performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor may be effectively removed to secure performance of the motor.

Therefore, in the hybrid vehicle or the electric vehicle according to the related art, a cooling device, a heat pump system, and a battery cooling system may be configured using separate closed circuits, respectively, to prevent heat generation in the motor, an electrical component, and the battery including the fuel cells.

Accordingly, size and weight of a cooling module mounted at the front of the vehicle are increased, and a layout of connection pipes supplying a coolant or a refrigerant to each of the heat pump system, the cooling device, and the battery cooling system in an engine compartment becomes complicated.

Furthermore, since the battery cooling system heating or cooling the battery depending on a state of the vehicle is separately provided so that the battery exhibits optimal performance, a plurality of valves for connecting the respective connection pipes to each other are used, and noise and vibrations due to frequent opening or closing operation of these valves are transferred to the interior of the vehicle, such that a ride comfort deteriorates.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle for heating or cooling a battery module by use of one chiller in which a refrigerant and a coolant are heat-exchanged, simplifying a system.

Various aspects of the present invention are directed to providing a heat pump system for a vehicle for selectively using waste heat of an external heat source, an electrical component, and a battery module in a heating mode of the vehicle, improving a heating efficiency.

A heat pump system for a vehicle may include a cooling apparatus including a radiator, a first water pump, and a first valve, which are connected by a coolant line, and circulating a coolant through the coolant line to cool at least one electrical component provided on the coolant line; a battery cooling apparatus including a battery radiator, a second water pump, and a second valve, which are connected by a battery coolant line, and circulating a coolant through a battery module provided on the battery coolant line; a heating apparatus including a heating line connected to the coolant line through a third valve to heat a vehicle interior by use of a coolant and a third water pump provided on the heating line, and a heater; and a chiller provided on a branch line mutually connecting a first connection line and a second connection line connected through the first valve and the second valve to selectively pass a coolant supplied from the cooling apparatus or the battery cooling apparatus to the branch line, connected to a refrigerant line of an air conditioner through a refrigerant connection line, and selectively heat-exchanging inflowed coolant with a refrigerant supplied from the air conditioner to adjust a temperature of the coolant, wherein a condenser of the air conditioner is connected to the heating line to pass the coolant circulating through the heating apparatus through the condenser.

The air conditioner may include: a heating, ventilation, and air conditioning (HVAC) module provided with an evaporator connected through the refrigerant line and a door, operation of which is adjustable so that outside air passing through the evaporator selectively inflows to the heater depending on cooling, heating, and dehumidification modes; a compressor connected through the refrigerant line between the evaporator and the condenser; a heat exchanger provided on the refrigerant line between the condenser and the evaporator; a first expansion valve provided on the refrigerant line between the heat exchanger and the evaporator; a second expansion valve provided on the refrigerant connection line; an accumulator provided on the refrigerant line between the evaporator and the compressor and connected to the refrigerant connection line; and a third expansion valve provided on the refrigerant line between the condenser and the heat exchanger.

The heat exchanger may additionally condense or evaporate the refrigerant condensed in the condenser through heat exchange with the outside air depending on a selective operation of the third expansion valve.

The second expansion valve may expand the refrigerant inflowed through the refrigerant connection line to flow to the chiller when cooling the battery module by the refrigerant.

The third expansion valve may selectively expand the refrigerant inflowed to the heat exchanger in a heating mode and a heating/dehumidification mode of the vehicle.

The HVAC module may further include an air heater mounted on a rear of the heater toward an interior of the vehicle to selectively heat the outside air passing through the heater.

One end portion of the refrigerant connection line may be connected to the refrigerant line between the heat exchanger and the first expansion valve, and the other end portion of the refrigerant connection line may be connected to the accumulator.

The battery radiator may be mounted on a front of the radiator at the front of the vehicle, and the heat exchanger may be mounted on the front of the battery radiator.

One end portion of the first connection line may be connected to the coolant line through the first valve, the other end portion of the first connection line may be connected to the battery coolant line through the second valve, the second connection line may connect the coolant line and the battery coolant line at a position separated from the first connection line via the radiator and the battery radiator, and the first and second connection lines may be selectively connectable through the coolant line, or the battery coolant line and the branch line according to the operation of the first and second valves, respectively.

When cooling the electrical component and the battery module by use of each coolant cooled in the radiator and the battery coolant line, the first and second connection lines and the branch line may be closed through operation of the first and second valves, and the cooling apparatus and the battery cooling apparatus may respectively form an independent closed circuit and may respectively circulate the coolant through the electrical component and the battery module through operation of the first and second water pumps.

When cooling the battery module in a cooling mode of the vehicle, in the cooling apparatus, the connection of the coolant line and the first connection line may be closed through operation of the first valve, the coolant cooled in the radiator circulates the electrical component through operation of the first water pump, in the battery cooling apparatus, the battery coolant line and the first connection line, the second connection line, and the branch line may be connected through operation of the second valve, the coolant passing through the chiller may be supplied to the battery module without passing through the battery radiator through operation of the second water pump, in the heating apparatus, the coolant line and the heating line may be connected through operation of the third valve so that the coolant is supplied from the cooling apparatus, in the air conditioner, in a state that the refrigerant connection line is opened through operation of the second expansion valve, the refrigerant may circulate along the refrigerant line and the refrigerant connection line, the first and second expansion valves may expand the refrigerant so that the expanded refrigerant is supplied to the evaporator and the chiller, respectively, and the third expansion valve may inflow the refrigerant supplied from the condenser to the heat exchanger.

The heating apparatus may supply the coolant supplied from the cooling apparatus through operation of the third water pump to the condenser, the condenser condenses the refrigerant through heat exchange with the coolant, and the heat exchanger may additionally condense the refrigerant inflowed from the condenser through heat exchange with the outside air.

When recovering the waste heat of the external heat source and the electrical component in a heating mode of the vehicle, in the cooling apparatus, the coolant line and the first connection line, the second connection line, and the branch line may be connected through operation of the first valve, the coolant passing through the electrical component may be supplied to the chiller without passing through the radiator through operation of the first water pump, the coolant line and the heating line may respectively form an independent closed circuit through operation of the third valve, in the heating apparatus, the coolant may circulate along the heating line through operation of the third water pump, in the air conditioner, the refrigerant line connecting the condenser and the evaporator may be closed through operation of the first expansion valve, the refrigerant connection line may be opened through operation of the second expansion valve, the second expansion valve may expand the refrigerant supplied to the refrigerant connection line to be supplied to the chiller, and the third expansion valve may expand the refrigerant supplied from the condenser to be supplied to the heat exchanger.

When recovering the waste heat of the external heat source and the battery module in a heating mode of the vehicle, in the battery cooling apparatus, the battery coolant line and the first connection line, the second connection line, and the branch line may be connected through operation of the second valve, the coolant passing through the battery module may be supplied to the chiller without passing through the battery radiator through operation of the second water pump, in the heating apparatus, the connection of the coolant line and the heating line may be closed through operation of the third valve, the coolant may circulate through the heating line through operation of the third water pump, in the air conditioner, the refrigerant line connecting the condenser and the evaporator may be closed through operation of the first expansion valve, the refrigerant connection line may be opened through operation of the second expansion valve, the second expansion valve may expand the refrigerant supplied to the refrigerant connection line to be supplied to the chiller, and the third expansion valve may expand the refrigerant supplied from the condenser to be supplied to the heat exchanger.

When performing the heating mode of the vehicle by use of the waste heat of the electrical component, in the cooling apparatus, the coolant line and the first connection line, the second connection line, and the branch line may be connected through operation of the first valve, the coolant passing through the electrical component may circulate through the coolant line and the first connection line, the second connection line, and the branch line without passing through the radiator through operation of the first water pump, in the heating apparatus, the coolant line and the heating line may be connected through operation of the third valve, in the cooling apparatus, the coolant with the temperature increased by the waste heat of the electrical component may circulate through the heating line through operation of the third water pump, and the operation of the battery cooling apparatus and the air conditioner may be stopped.

In a heating/dehumidification mode of the vehicle, in the cooling apparatus, the coolant line and the first connection line, the second connection line, and the branch line may be connected through operation of the first valve, the coolant passing through the electrical component may be supplied to the chiller without passing through the radiator through operation of the first water pump, the coolant line and the heating line may respectively form an independent closed circuit through operation of the third valve, in the heating apparatus, the coolant may circulate along the heating line through operation of the third water pump, the coolant line and the heating line may respectively form an independent closed circuit through operation of the third valve, in the heating apparatus, the coolant may circulate along the heating line through operation of the third water pump, in the heating apparatus, the coolant line and the heating line may be connected through operation of the third valve such that the coolant is supplied from the cooling apparatus, in the air conditioner, in the state that the refrigerant connection line is opened through operation of the second expansion valve, the refrigerant may circulate along the refrigerant line and the refrigerant connection line, and the first and second expansion valves may expand the refrigerant so that the expanded coolant is respectively supplied to the evaporator and the chiller.

The third expansion valve may expand the refrigerant supplied from the condenser to be inflowed to the heat exchanger when the temperature of the vehicle interior is low, and when the temperature of the vehicle interior is high, the refrigerant supplied from the condenser may be inflowed to the heat exchanger without being in the expanded state.

When increasing the temperature of the battery module, the coolant line and the battery coolant line may be connected to the first and second connection lines through operation of the first valve and the second valve, and the branch line may be closed, in the state that the operation of the second water pump is stopped, the coolant passing through the electrical component may be supplied to the battery module without passing the radiator and the battery radiator through operation of the first water pump, in the heating apparatus, the coolant line and the heating line may be connected through operation of the third valve, and in the cooling apparatus, the coolant with the temperature increased by the waste heat of the electrical component may circulate through the heating line through operation of the third water pump, and the operation of the air conditioner may be stopped.

The first, second, and third expansion valves may be electrical expansion valves selectively expanding the refrigerant while controlling a flow of the refrigerant passing through the refrigerant line, or the refrigerant connection line.

In the heating line between the third water pump and the heater, a coolant heater to selectively heat the coolant may be provided.

As described above, according to the heat pump system for the vehicle according to an exemplary embodiment of the present invention, the system may be simplified by heating or cooling the battery module according to the mode of the vehicle by use of a single chiller that exchanges heat between the refrigerant and the coolant and implementing the heating mode of the vehicle by use of the coolant.

Furthermore, the present invention may efficiently optimize the performance of the battery module by efficiently warming and cooling the battery module to be suitable for the vehicle's mode, and increase the overall travel distance of the vehicle through the efficient battery module management.

Furthermore, the present invention may improve the heating efficiency by selectively using the external heat and the waste heat of the electrical component and the battery module in the heating mode of the vehicle.

The present invention also improves the cooling performance by increasing the condensing or evaporation performance of the coolant by use of the condenser and the heat exchanger, improving the cooling performance and reducing the consumption power of the compressor.

Furthermore, the present invention may reduce a production cost and weight by simplifying the entire system and improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
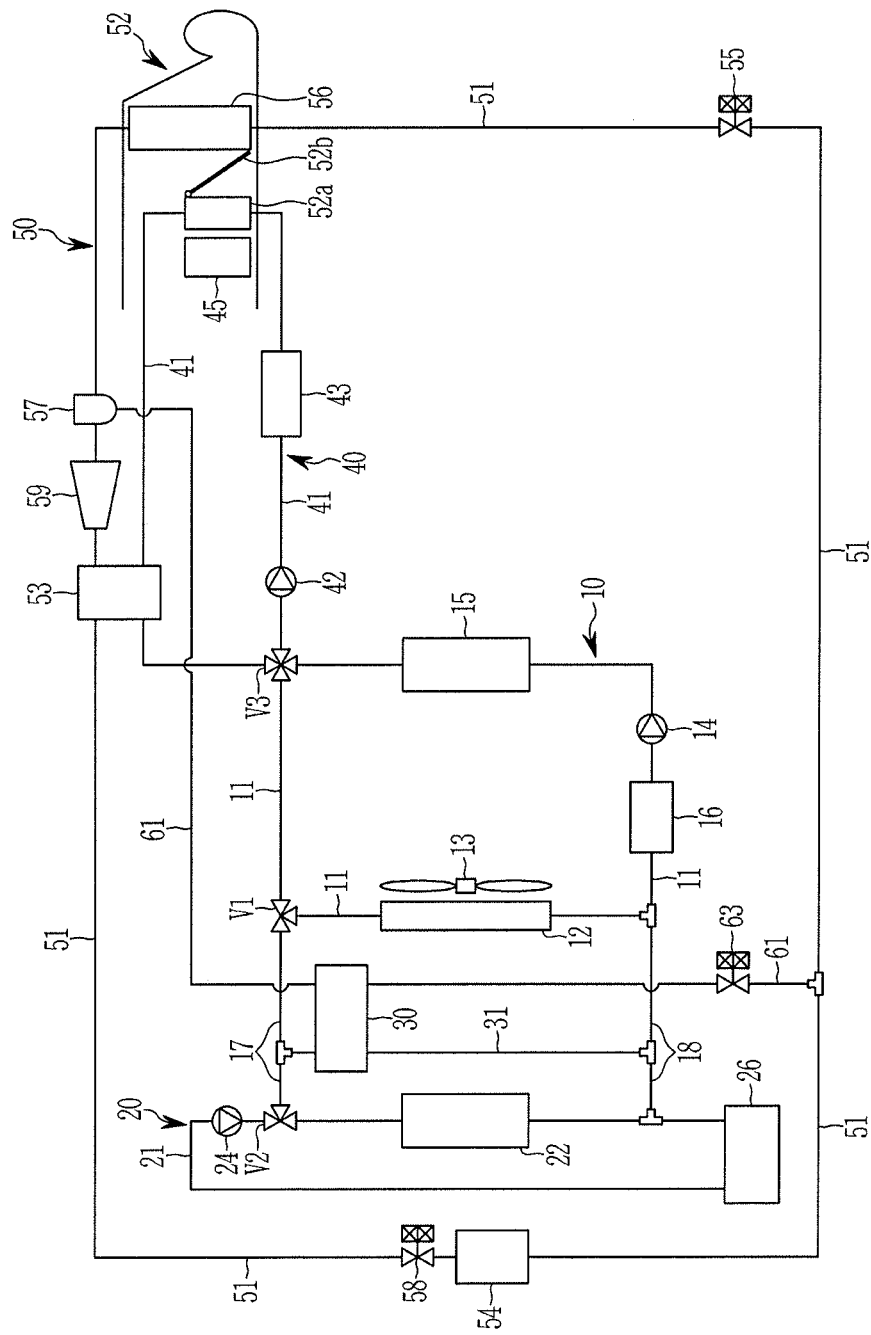
FIG. 1 is a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it may be understood that there may be various equivalents and modifications configured for replacing them at the time of filing of the present application.

To clarify the present invention, portions that are not connected to the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout the present specification and the claims which follow, unless explicitly described to the contrary, the word "comprise" or variations such as "comprises" or "comprising" will be understood to imply the inclusion of stated elements but not the exclusion of any other elements.

Furthermore, the terms, " . . . unit", " . . . mechanism", " . . . portion", " . . . member", etc. used herein mean a unit of inclusive components performing at least one functions or operations.

FIG. 1 is a block diagram of a heat pump system for a vehicle according to an exemplary embodiment of the present invention.

The heat pump system for the vehicle according to an exemplary embodiment of the present invention heats or cools a battery module 26 by use of one chiller 30 in which a refrigerant and a coolant are heat-exchanged, and utilizes waste heat of an electrical component 15 and the battery module 26, improving heating efficiency.

Here, in the heat pump system for the electric vehicle, a cooling apparatus 10 for cooling the electrical component 15, a battery cooling apparatus 20 for cooling the battery module 26, a heating apparatus 40 heating an interior by use of a coolant, and an air conditioner 50 which is an air conditioning apparatus of cooling the interior may be mutually interconnected.

That is, referring to FIG. 1, the heat pump system includes the cooling apparatus 10, the battery cooling apparatus 20, the chiller 30, and the heating apparatus 40.

First, the cooling apparatus 10 includes a radiator 12, a first water pump 14, and a first valve V1 that are connected by a coolant line 11. The cooling apparatus 10 circulates the coolant through the coolant line 11 through operation of the first water pump 14 to cool the electrical component 15.

The radiator 12 is mounted in the front of the vehicle and a cooling fan 13 is provided at the rear of the radiator 12 and cools the coolant through operation of the cooling fan 13 and the heat exchange with outside air.

Here, the electrical component 15 may include a motor, a power control apparatus, an inverter, or a charger (On Board Charger, OBC).

The power control apparatus or the inverter may be heated while traveling, and the charger may be heated when the battery module 26 is charged.

Also, a reservoir tank 16 is provided on the coolant line 11 between the radiator 12 and the first water pump 14. The coolant cooled in the radiator 12 may be stored in the reservoir tank 16.

The cooling apparatus 10 thus configured circulates the coolant cooled in the radiator 12 along the coolant line 11 through operation of the first water pump 14 to cool the electrical component 15 to prevent it from overheating.

In the exemplary embodiment of the present invention, the battery cooling apparatus 20 includes a battery radiator 22, a second water pump 24, and a second valve V2 which are connected by a battery coolant line 21, and the coolant is circulated through the battery coolant line 21.

The battery cooling apparatus 20 may selectively supply the coolant cooled in the battery radiator 22 to the battery module 26. Here, the battery module 26 is provided in the battery coolant line 21.

The battery module 30 may be formed as a water-cooled type that supplies power to the electrical component 15 and the motor, and is cooled by a coolant flowing along the battery coolant line 31.

On the other hand, the battery radiator 22 is mounted in the front of the radiator 12, and cools the coolant through operation of the cooling fan 13 and the heat exchange with the outside air.

The battery cooling apparatus 20 thus configured may circulate the coolant cooled in the battery radiator 22 along the battery coolant line 21 through operation of the second water pump 24.

In the exemplary embodiment of the present invention, the chiller 30 is provided on a branch line 31 mutually connecting a first connection line 17 connected through the first valve V1 and the second valve V2, and a second connection line 18.

The chiller 30 passes through the coolant supplied from the cooling apparatus 10, or the battery cooling apparatus 20, and is connected to a refrigerant line 51 of the air conditioner 50 through a refrigerant connection line 61.

Accordingly, the chiller 30 heat-exchanges the coolant selectively inflowed from the cooling apparatus 10 or the battery cooling apparatus 20 with the refrigerant supplied from the air conditioner 50, controlling a temperature of the coolant. Here, the chiller 30 may be a water-cooled heat exchanger in which a coolant flows.

One end portion of the first connection line 17 may be connected to the coolant line 11 via the first valve V1. The other end portion of the first connection line 17 may be connected to the battery coolant line 21 via the second valve V2.

The second connection line 18 may connect the coolant line 11 and the battery coolant line 21 at a distance separated from the first connection line 17 via the radiator 12 and the battery radiator 22.

This second connection line 18 may be selectively opened or closed according to the operation of the first and second valves V1 and V2 and the first and second water pumps 14 and 24.

On the other hand, the first and second connection lines 17 and 18 may be selectively connectable via the coolant line 11, or the battery coolant line 21 and the branch line 18, respectively, according to the operation of the first and second valves V1 and V2.

Here, when the branch line 18 is closed, the first and second connection lines 17 and 18 may connect the coolant line 11 and the battery coolant line 21 so that the cooling apparatus 10 and the battery cooling apparatus 20 communicate with each other.

That is, the first and second valves V1 and V2 selectively connect the coolant line 11 and the battery coolant line 21 or separate the cooling apparatus 10 and the battery cooling apparatus 20 through the first and second connection lines 17 and 18 to control the flow of the coolant.

Thus, the first valve V1 may close the first connection line 17 when the electrical component 15 is cooled using the coolant cooled in the radiator 12. At the instant time, the second connection line 18 and the branch line 31 may be closed.

Thus, the coolant cooled in the radiator 12 may cool the electrical component 15 while flowing along the coolant line 11 connected through operation of the first valve V1.

On the other hand, the second valve V2 may close the first connection line 17 when the battery module 26 is cooled using the coolant cooled in the battery radiator 22. At the instant time, the second connection line 18 and the branch line 31 may be closed.

Thus, the coolant cooled in the battery radiator 22 may cool the battery module 26 while flowing along the battery coolant line 21 connected through operation of the second valve V2.

Also, the second valve V2 may open the first and second connection lines 17 and 18 and the branch line 31 and close the connection of the coolant line 11 and the battery coolant line 21 when the battery module 26 is cooled by use of the coolant which undergoes heat transfer with the refrigerant.

Accordingly, the coolant of the low temperature, which is completely heat-exchanged with the refrigerant in the chiller 30, inflows to the battery module 26 along the battery coolant line 21 connected to the first and second connection lines 17 and 18 through the branch line 31, efficiently cooling the battery module 26.

Also, the heating apparatus 40 may include a heating line 41 connected to the coolant line 11 through a third valve V3, and a third water pump 42 and a heater 52a provided in the heating line 41 to cool a vehicle interior by use of the coolant.

The heater 52a may be provided inside a heating, ventilation, and air conditioning (HVAC) module 52 included in the air conditioner 50.

Here, a coolant heater 43 to selectively heat the coolant circulating in the heating line 41 may be provided in the heating line 41 between the third water pump 42 and the heater 52a.

The coolant heater 43 is ON-operated when the temperature of the coolant supplied to the heater 52a in the heating mode of the vehicle is lower than a target temperature to heat the coolant circulated in the heating line 41, inflowing the coolant of which the temperature is increased to the heater 52a.

The coolant heater 43 may be an electric heater that operates according to the power supply.

On the other hand, in the exemplary embodiment of the present invention, it is described that the coolant heater 43 is provided in the heating line 41, however it is not limited thereto, and an air heater 45 to increase the temperature of the outside air inflowing to the interior of the vehicle may be applied instead of the coolant heater 43.

The air heater 45 may be mounted on the rear of the heater 52a toward the interior of the vehicle inside the HVAC module 52 to selectively heat the outside air passing through the heater 52a.

That is, the heating apparatus 40 may be applied to one of the coolant heater 43 and the air heater 45.

The heating apparatus 40 constructed as described above supplies the high temperature coolant inflowed from the cooling apparatus 10 to the heating line 41 in the heating mode of the vehicle or the coolant of which the temperature is increased while circulating through the heating line 41 to the heater 52a through operation of the third water pump 42, cooling the vehicle interior.

Here, the first, second, and third water pumps 14, 26, and 42 may be electric water pumps.

On the other hand, in the exemplary embodiment of the present invention, the air conditioner 50 includes the Heating, ventilation, and air conditioning (HVAC) module 52, a condenser 53, a heat exchanger 54, a first expansion valve 55, an evaporator 56, an accumulator 57, and a compressor 59, which are connected through the refrigerant line 51.

First, in the HVAC module 52, the evaporator 56 connected through the refrigerant line 51 and a door 52b controlling the outside air passing through the evaporator 56 to selectively inflow to the heater 52a depending on heating, cooling, and heating/dehumidification modes of the vehicle are provided.

That is, the door 52b is opened so that the outside air passing through the evaporator 56 in the heating mode of the vehicle inflows to the heater 52a. Conversely, in the vehicle cooling mode, the door 52b closes the heater 52a side so that the outside air which is cooled while passing through the evaporator 56 inflows directly to the interior of the vehicle.

The condenser 53 is connected to the refrigerant line 51 so that the refrigerant passes through the condenser 53 and is connected to the heating line 41 to allow the coolant circulating through the heating unit 40 to pass therethrough.

The condenser 53 may condense the refrigerant through heat exchange with the coolant supplied through the heating line 41. In other words, the condenser 53 may be a water-cooled heat exchanger into which the coolant flows.

The condenser 53 configured as described above may heat-exchange the refrigerant supplied from the compressor 59 with the coolant supplied from the heating device 40 to condense the refrigerant.

In the exemplary embodiment of the present invention, the heat exchanger 54 may be provided in the refrigerant line 51 between the condenser 53 and the evaporator 56.

The first expansion valve 55 is provided in the refrigerant line 51 between the heat exchanger 54 and the evaporator 56. The first expansion valve 55 receives and expands the refrigerant passing through the heat exchanger 54.

The accumulator 57 is provided in the refrigerant line 51 between the evaporator 56 and the compressor 59 and is connected to the refrigerant connection line 61.

Such an accumulator 57 improves the efficiency and durability of the compressor 59 by supplying only the gaseous refrigerant to the compressor 59.

In the exemplary embodiment of the present invention, one end portion of the refrigerant connection line 61 is connected to the refrigerant line 51 between the heat exchanger 54 and the first expansion valve 55. The other end portion of the refrigerant connection line 61 may be connected to the accumulator 57.

Here, the accumulator 55 may supply the gaseous refrigerant of the refrigerant supplied through the refrigerant connection line 61 to the compressor 59.

On the other hand, the refrigerant connection line 61 is provided with a second expansion valve 63, and the refrigerant line 51 between the condenser 53 and the heat exchanger 54 may be provided with a third expansion valve 58.

The second expansion valve 63 may expand the coolant inflowed through the refrigerant connection line 61 to inflow to the chiller 30 when cooling the battery module 26 with the refrigerant.

Here, when cooling the battery module 26 with the refrigerant in the cooling mode of the vehicle, the second expansion valve 63 is operated when recovering the waste heat of the electrical component 15, or the battery module 26, in the heating mode and heating/dehumidification mode of the vehicle.

This second expansion valve 63 may expand the refrigerant inflowed through the refrigerant connection line 61 to inflow to the chiller 30.

That is, the second expansion valve 63 expands the refrigerant discharged from the heat exchanger 54 and flowing into the chiller 30 while lowering the temperature of the refrigerant, the temperature of the coolant may be further lowered.

As a result, the battery module 26 may be cooled more efficiently by inflowing the coolant having the lower temperature while passing through the chiller 30.

The third expansion valve 58 may selectively expand the coolant which is inflowed to the heat exchanger 54 in the heating mode and the heating/dehumidification mode of the vehicle.

Here, the heat exchanger 54 may further condense or evaporate the refrigerant condensed from the condenser 53 through heat exchange with the outside air, depending on the selective operation of the third expansion valve 58.

In other words, the heat exchanger 54 is mounted in the front of the battery radiator 22 to mutually heat-exchange the coolant that has been inflowed therein with the outside air.

Thus, the heat exchanger 54 may increase subcooling of the refrigerant by further condensing the refrigerant condensed at the condenser 53, improving a COP (Coefficient Of Performance), which is a coefficient of cooling capacity versus power required by the compressor.

The compressor 59 is connected via the refrigerant line 51 between the evaporator 56 and the condenser 53. This compressor 59 may compress the refrigerant in the gas state and supply the compressed refrigerant to the condenser 53.

The first, second, and third expansion valves 55, 61, and 65 may be electronic expansion valves that selectively expand the refrigerant while controlling the flow of the refrigerant passing through the refrigerant line 51 or the refrigerant connection line 61.

Also, the first and second valves V1 and V2 may three-way valves which may distribute the flow, and the third valve V3 may be a four-way valve.

Hereinafter, the operation and action of the heat pump system for the vehicle according to an exemplary embodiment of the present invention is described with reference to FIG. 2 to FIG. 8 in detail.

First, the operation of the heat pump system for the vehicle according to an exemplary embodiment of the present invention is described with reference to FIG. 2 when cooling the electrical component 15 and the battery module 26 by use of the coolant.

Figure 2:
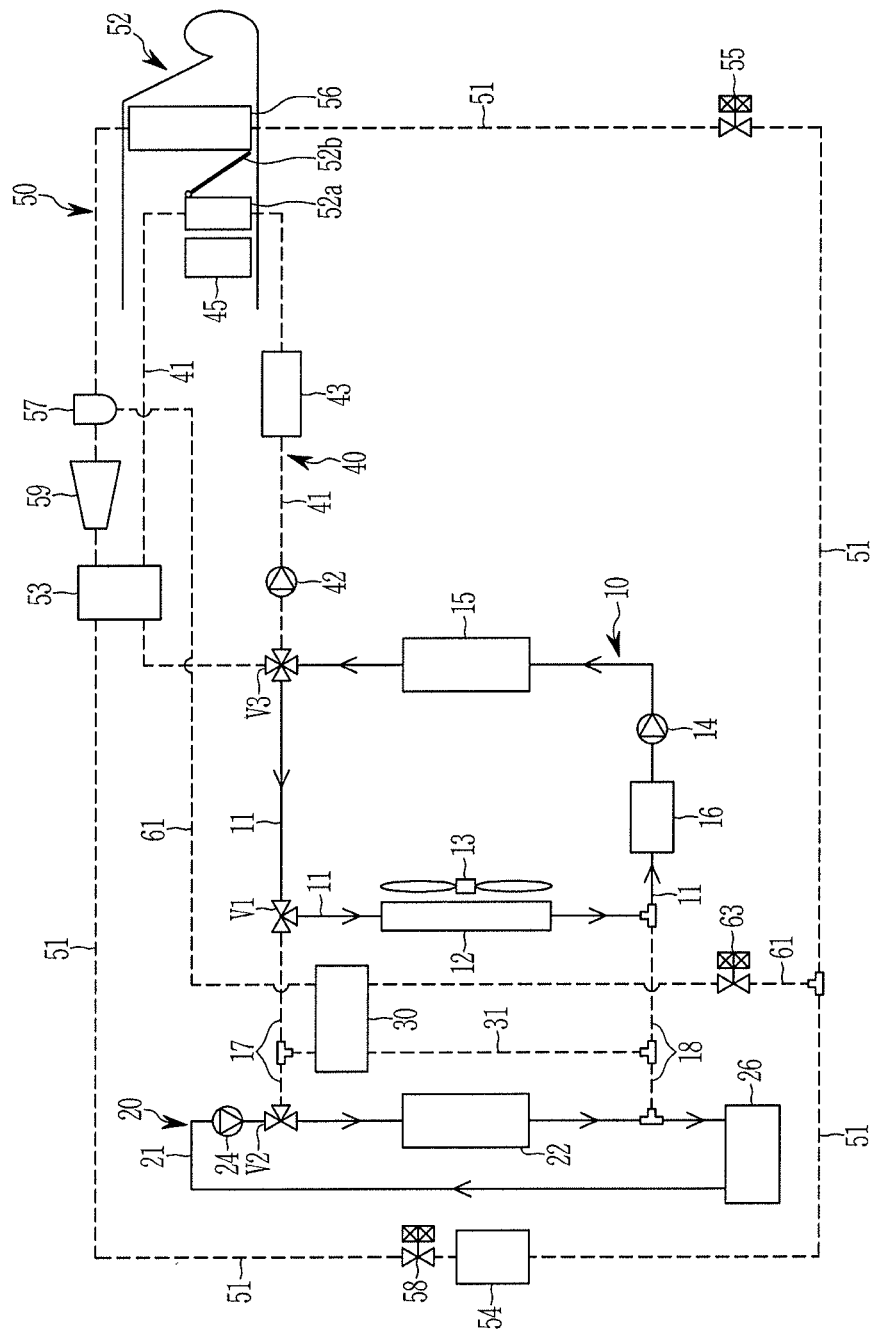
FIG. 2 is an operational stage diagram when cooling an electrical component and a battery module by use of a coolant in a heat pump system for a vehicle according to an exemplary embodiment of the present invention.

FIG. 2 is an operational stage diagram when cooling an electrical component and a battery module by use of a coolant in a heat pump system for a vehicle according to an exemplary embodiment of the present invention.

Referring to FIG. 2, the first water pump 14 is operated in the cooling apparatus 10 to the cool the electrical component 15. Thus, the coolant cooled in the radiator 12 is circulated in the electrical component 15.

In the battery cooling apparatus 20, the second water pump 24 is operated to cool the battery module 26. Thus, the coolant cooled by the battery radiator 22 is circulated in the battery module 26.

Here, the first and second connection lines 17 and 18 and the branch line 31 are closed through operation of the first and second valves V1 and V2.

Accordingly, the cooling apparatus 10 and the battery cooling apparatus 20 may independently form a closed circuit through the coolant line 11 and the battery coolant line 21, respectively.

In other words, the coolant cooled in the radiator 12 may be inflowed to the electrical component 15 through the coolant line 11, and may be inflowed to the radiator 12 after cooling the electrical component 15.

Also, the coolant cooled in the battery radiator 22 may be inflowed to the battery module 26 via the battery coolant line 21, and may be inflowed to the battery radiator 22 after cooling the battery module 26.

That is, the coolant of the low temperature cooled by the radiator 12 and the battery radiator 22, respectively, may cool only the electrical component 15 and the battery module 26 individually, cooling the electrical component 15 and the battery module 26 efficiently.

Here, the air conditioner 50 does not work because the vehicle's cooling mode is not activated.

On the other hand, in the exemplary embodiment of the present invention, it is described that both the electrical component 15 and the battery module 26 are cooled by the coolant, however it is not limited thereto, and the cooling apparatus 10 and the battery cooling apparatus 20 may be selectively operated when separately cooling one of the electrical component 15 and the battery module 26.

The operation when cooling the battery module 30 depending on the cooling mode of the vehicle is described with reference to FIG. 3.

Figure 3:
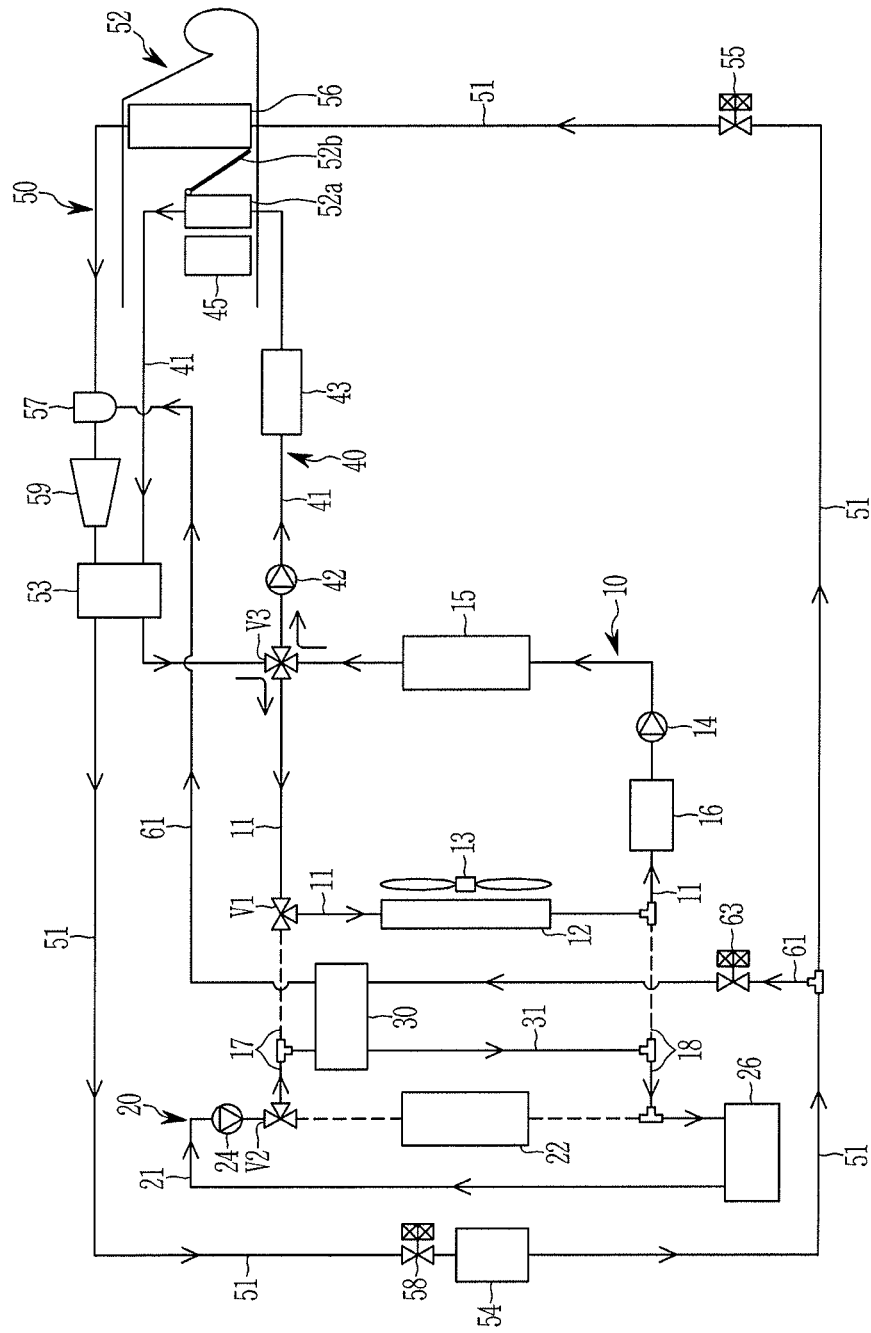
FIG. 3 is an operational state diagram for a cooling of a battery module depending on a cooling mode in a heat pump system for a vehicle according to an exemplary embodiment of the present invention.

FIG. 3 is an operational state diagram for cooling of a battery module depending on a cooling mode in a heat pump system for a vehicle according to an exemplary embodiment of the present invention.

Referring to FIG. 3, in the cooling apparatus 10, the first water pump 14 is operated to cool the electrical component 15. Accordingly, the coolant cooled by the radiator 12 is circulated to the electrical component 15.

Here, the coolant line 11 and the first connection line 17 are not connected through operation of the first valve V1.

In the heating apparatus 40, the coolant line 11 and the heating line 41 are connected through operation of the third valve V3 such that the coolant supplied from the cooling apparatus 11 is circulated.

Thus, the coolant cooled by the radiator 12 may be supplied to the condenser 53 through operation of the first and third water pumps 14 and 42.

In the battery cooling apparatus 20, the battery coolant line 21 and the first connection line 17, the second connection line 18, and the branch line 31 are connected through operation of the second valve V2. in the instant state, the coolant passing through the chiller 30 may be supplied to the battery module 26 through operation of the second water pump 24 without passing through the battery radiator 22.

That is, in the battery cooling apparatus 20, the opened branch line 31 and the first and second connection lines 17 and 18 are connected to the battery coolant line 21 to form the closed circuit in which the coolant independently circulates.

In the air conditioner 50, each constituent element operates to cool the vehicle interior. Thus, the refrigerant circulates along the refrigerant line 51.

Here, in the state that the refrigerant connection line 61 is opened through operation of the second expansion valve 63, the refrigerant circulates along the refrigerant line 51 and the refrigerant connection line 61.

The first and second expansion valves 55 and 63 expand the refrigerant so that the expanded refrigerant is supplied to the evaporator 56 and the chiller 30, respectively. The third expansion valve 58 may inflow the refrigerant supplied from the condenser 53 to the heat exchanger 54 without expanding.

Accordingly, the heating apparatus 40 supplies the coolant supplied from the cooling apparatus 10 to the condenser 53 through operation of the third water pump 42.

The condenser 53 condenses the coolant using the coolant flowing along the heating line 41. Also, the heat exchanger 54 may additionally condense the refrigerant inflowed from the condenser 53 through operation of the third expansion valve 58 through heat exchange with the outside air.

On the other hand, the coolant passing through the chiller 30 circulates through the battery coolant line 21, the first and second connection lines 17 and 18, and the branch line 31 to cool the battery module 26 through operation of the second water pump 24.

The coolant passing through the chiller 30 is cooled through heat exchange with the refrigerant supplied to the chiller 30. The coolant cooled by the chiller 30 is supplied to the battery module 26. Accordingly, the battery module 26 is cooled by the cooled coolant.

That is, the second expansion valve 63 expands some of the refrigerant in the refrigerant passing through the heat exchanger 54 to supply the expanded refrigerant to the chiller 30 and opens the refrigerant connection line 61.

Therefore, some of the refrigerant which is exhausted from the heat exchanger 54 is expanded through operation of the second expansion valve 63 to be in a low temperature and low pressure state, and inflows into the chiller 30 connected to the refrigerant connection line 61.

Then the refrigerant inflowed to the chiller 30 undergoes heat transfer with the coolant, and then inflows to the compressor 59 after passing through the accumulator 57 through the refrigerant connection line 61.

In other words, the coolant with the increased temperature from cooling the battery module 26 is cooled through heat exchange inside the chiller 30 with the low temperature low pressure refrigerant. The cooled coolant is again supplied to the battery module 30 through the battery coolant line 21, the first and second connection lines 17 and 18, and the branch line 31.

That is, the coolant may efficiently cool the battery module 26 while repeating the above-described operation.

Meanwhile, the remaining coolant exhausted from the heat exchanger 54 flows through the refrigerant line 51 to cool the interior of the vehicle, and sequentially passes through the first expansion valve 55, the evaporator 56, the accumulator 57, the compressor 59, and the main heat exchanger 53.

Here, the outside air which is inflowed to the HVAC module 52 is cooled by the low temperature refrigerant inflowed to the evaporator 56 while passing through the evaporator 56.

At the present time, the door 52b reduces a portion of the cooled outside air passing through the heater 52a to not pass through the heater 52a. Thus, the cooled outside air may be directly directed into the interior of the vehicle, cooling the interior of the vehicle.

On the other hand, in the evaporator 56, the refrigerant of which the condensed amount is increased while sequentially passing through the condenser 53 and the heat exchanger 54 is expanded and supplied, evaporating the refrigerant with the further lower temperature.

That is, in the exemplary embodiment of the present invention, the condenser 53 condenses the refrigerant, and the heat exchanger 54 further condenses the refrigerant, favoring the subcooling formation of the refrigerant.

As the subcooled refrigerant evaporates with the lower temperature in the evaporator 56, the temperature of the coolant which is heat exchanged at the evaporator 56 may be further reduced, improving cooling performance and efficiency.

That is, while repeating the above-described process, the refrigerant may cool the interior of the vehicle in the cooling mode and simultaneously cool the coolant through the heat exchange while passing through the chiller 30.

The coolant of a low temperature cooled by the chiller 30 inflows to the battery module 26. Accordingly, the battery module 26 may be efficiently cooled by the supplied low temperature coolant.

In the exemplary embodiment of the present invention, the operation for the case of recovering the waste heat of the external heat source and the electrical component 15 in the heating mode of the vehicle is described with reference to FIG. 4.

Figure 4:
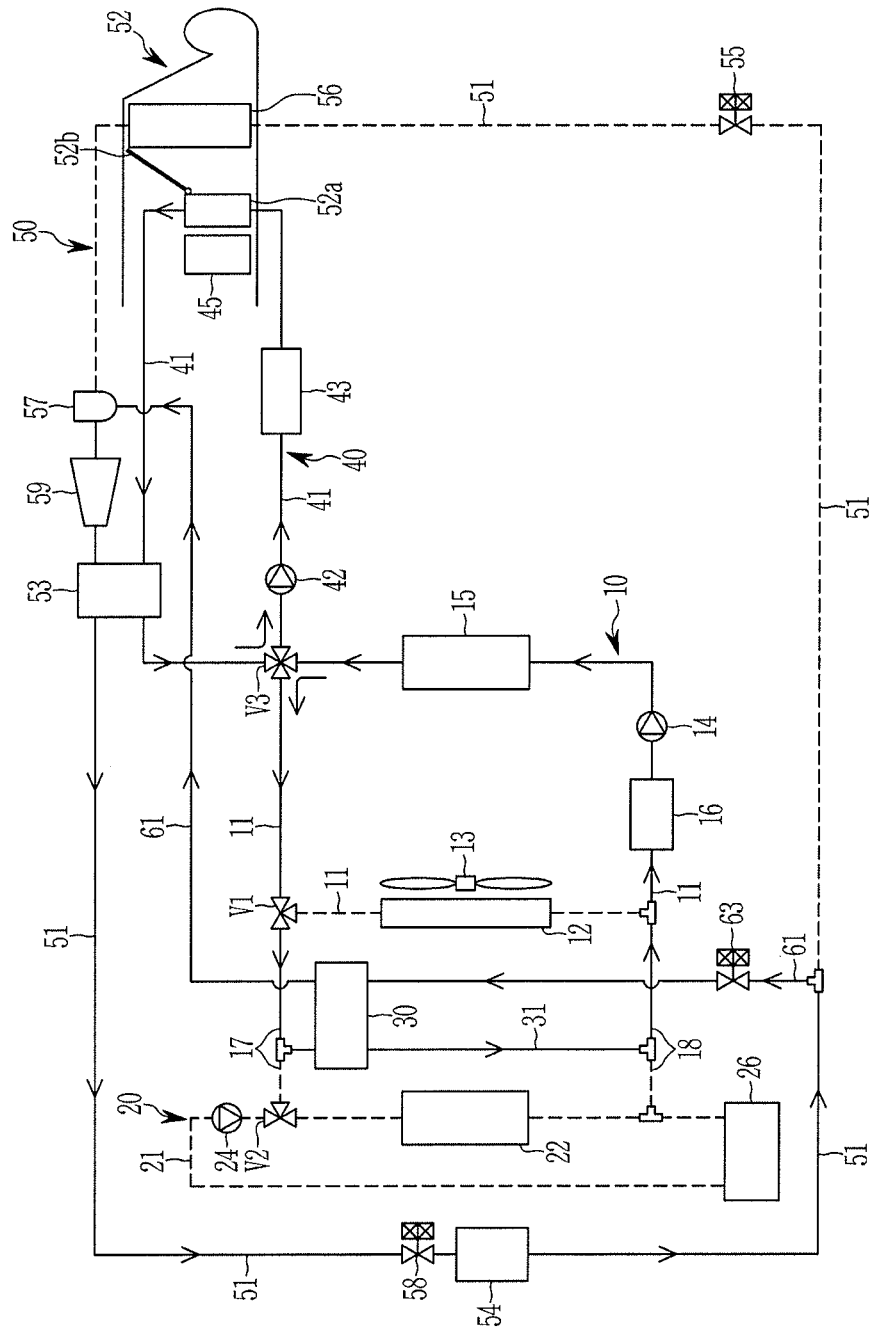
FIG. 4 is an operational state diagram for waste heat recovery of external heat and an electrical component depending on a heating mode in a heat pump system for a vehicle according to an exemplary embodiment of the present invention.

FIG. 4 is an operational state diagram for a waste heat recovery of external heat and an electrical component depending on a heating mode in a heat pump system for a vehicle according to an exemplary embodiment of the present invention.

Referring to FIG. 4, the heat pump system may absorb the external heat from the outside thereof air along with the waste heat of the electrical component 15 in an initial starting idle state IDLE of the vehicle where the waste heat of the electrical component 15 is insufficient.

First, in the cooling apparatus 10, the coolant line 11 and the first connection line 17, the second connection line 18, and the branch line 31 are connected through operation of the first valve V1. In the instant state, the coolant passing through the electrical component 15 may be supplied to the chiller 30 without passage through the radiator 12 through operation of the first water pump 14.

That is, in the cooling apparatus 10, the opened branch line 31 and the first and second connection lines 17 and 18 are connected to the coolant line 11.

Thus, the coolant passing through the electrical component 15 continuously circulates along the coolant line 11, the first and second connection lines 17 and 18, and the branch line 31 without passing through the radiator 12, and absorbs the waste heat from the electrical component 15 such that the temperature is increased.

The coolant with the increased temperature may be supplied to the chiller 30. That is, the waste heat generated by the electrical component 15 raises the temperature of the coolant circulating through the coolant line 11.

Meanwhile, the operation of the battery cooling apparatus 20 is shut downwards.

In the heating apparatus 40, the coolant circulates along the heating line 41 through operation of the third water pump 42.

On the other hand, the coolant line 11 and the heating line 41 may form the independent closed circuit through operation of the third valve V3.

Thus, the coolant circulating through the heating line 41 may be supplied to the condenser 53 after passing through the heater 52a through operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 operates when the temperature of the outside air passing through the heater 52a is lower than the target temperature, and the outside air inflowed to the interior of the vehicle may be heated.

In the air conditioner 50, each constituent element operates to heat the vehicle interior. Thus, the refrigerant circulates along the refrigerant line 51.

Here, the refrigerant line 51 connecting the condenser 53 and the evaporator 56 is closed through operation of the first expansion valve 55.

The refrigerant connection line 61 is opened through operation of the second expansion valve 63.

Here, the second expansion valve 63 may supply the refrigerant to the chiller 30 by expanding the refrigerant supplied from the heat exchanger 54 to the refrigerant connection line 61.

The third expansion valve 58 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the electrical component 15 and is increased in temperature, is recovered by increasing the temperature of the refrigerant supplied to the chiller 30 while passing through the chiller 30 through operation of the first water pump 14.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the electrical component 15, recovering the waste heat of the electrical component 15.

Next, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the heating line 41. The coolant with raised temperature is supplied to the heater 52a.

Meanwhile, the door 52b is opened so that the outside air inflowed to the HVAC module 52 and passing through the evaporator 56 passes through the heater 52a.

As a result, the outside air inflow from the outside thereof flows into the internal in an uncooled temperature state when passing through the evaporator 56, which is not supplied with the refrigerant. The inflowed outside air is converted to a high temperature state while passing through the heater 52a to be inflowed into the interior of the vehicle, realizing the heating of the interior of the vehicle.

That is, the heat pump system according to the exemplary embodiment of the present invention absorbs the external heat from the heat exchanger 54 when the cooling is required in the initial starting idle state (IDLE) of the vehicle and is used to increase the temperature of the refrigerant by use of the waste heat of the electrical component 15, reducing the power consumption of the compressor 59 and improving the cooling efficiency.

In the exemplary embodiment of the present invention, the operation for the case recovering the external heat and the waste heat of the battery module 26 in the heating mode of the vehicle is described with reference to FIG. 5.

Figure 5:
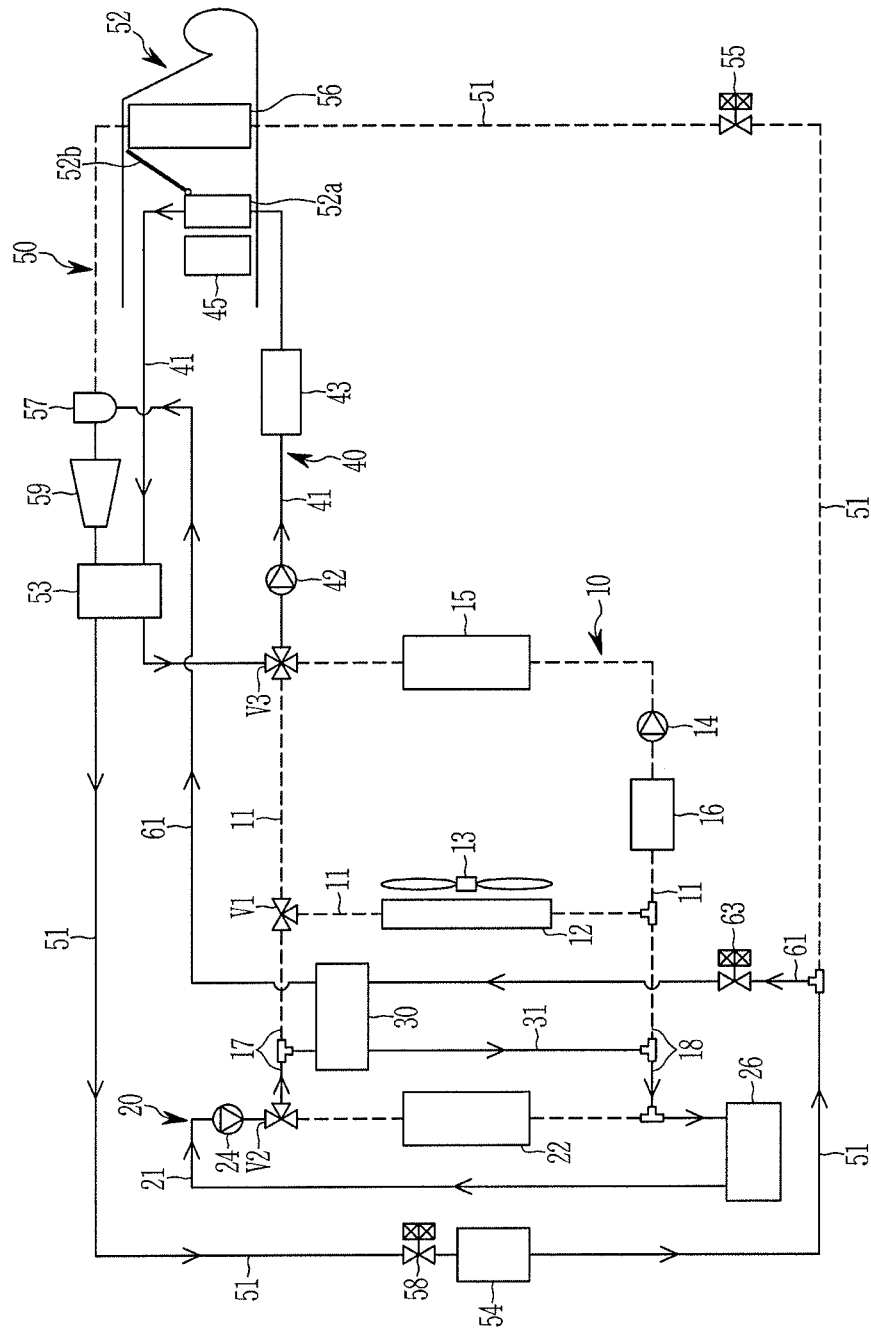
FIG. 5 is an operational state diagram for waste heat recovery of external heat and a battery module depending on a heating mode in a heat pump system for a vehicle according to an exemplary embodiment of the present invention.

FIG. 5 is an operational state diagram for a waste heat recovery of external heat and a battery module depending on a heating mode in a heat pump system for a vehicle according to an exemplary embodiment of the present invention.

Referring to FIG. 5, the heat pump system may absorb the waste heat of the battery module 26 along with the external heat from the outside thereof air during the vehicle's initial driving.

First, the operation of the cooling apparatus 10 is shut down.

In the battery cooling apparatus 20, the battery coolant line 21 and the first connection line 17, the second connection line 18, and the branch line 31 are connected through operation of the second valve V2.

In the present state, the coolant passing through the battery module 26 may be supplied to the chiller 30 without passage through the battery radiator 22 through operation of the second water pump 24.

That is, in the battery cooling apparatus 20, the branch line 31 and the first and second connection lines 17 and 18 are connected to the battery coolant line 21.

Thus, the coolant passed through the battery module 26 continuously circulates along the battery coolant line 21, the first and second connection lines 17 and 18, and the branch line 31 without passing through the battery radiator 22, and the temperature is increased by absorbing the waste heat from the battery module 26.

The coolant with the increased temperature may be supplied to the chiller 30. That is, the waste heat generated by the battery module 26 increases the temperature of the coolant circulating through the battery coolant line 21.

In the heating apparatus 40, the coolant circulates along the heating line 41 through operation of the third water pump 42.

Here, in the heating apparatus 40, the connection of the coolant line 11 and the heating line 41 may be closed through operation of the third valve V3.

Thus, the coolant circulating through the heating line 41 may be supplied to the condenser 53 after passing through the heater 52a through operation of the third water pump 42.

Here, the cooling water heater 43 is operated when the temperature of the coolant circulating along the heating line 41 is lower than the target temperature so that the coolant circulated in the heating line 41 may be heated.

On the other hand, when the air heater 45 is applied instead of the coolant heater 43, the air heater 45 is operated when the temperature of the outside air passing through the heater 52a is lower than the target temperature, such that the outside air inflowed to the interior of the vehicle may be heated.

In the air conditioner 50, each constituent element operates to heat the vehicle interior. Thus, the refrigerant circulates along the refrigerant line 51.

Here, the refrigerant line 51 connecting the condenser 53 and the evaporator 56 is closed through operation of the first expansion valve 55.

The refrigerant connection line 61 is opened through operation of the second expansion valve 63.

Here, the second expansion valve 63 may expand the refrigerant supplied from the heat exchanger 54 to the refrigerant connection line 61 to be supplied to the chiller 30.

Also, the third expansion valve 58 may expand the refrigerant supplied from the condenser 53 to be supplied to the heat exchanger 54.

Accordingly, the heat exchanger 54 recovers the external heat while evaporating the expanded refrigerant through the heat exchange with the outside air.

Also, the coolant of which the temperature is increased by absorbing the waste heat of the battery module 26 is recovered while increasing the temperature of the refrigerant supplied to the chiller 30 while passing through the chiller 30 through operation of the second water pump 24.

That is, the chiller 30 receives the refrigerant supplied from the heat exchanger 54 and expanded through operation of the second expansion valve 63 through the refrigerant connection line 61, and evaporates the supplied refrigerant through the heat exchange with the coolant of which the temperature is increased while passing through the battery module 26, recovering the waste heat of the battery module 26.

Next, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed from the compressor 59 with the high temperature high pressure state inflows to the condenser 53.

Here, the refrigerant supplied to the condenser 53 may increase the temperature of the coolant while exchanging heat with the coolant circulating through the heating line 41. The coolant with raised temperature is supplied to the heater 52a.

Meanwhile, the door 52b is opened to pass the outside air inflowed to the HVAC module 52 passing through the evaporator 56 through the heater 52a.

As a result, the outside air inflowed from the outside thereof flows into the internal in an uncooled temperature state when passing through the evaporator 56, which is not supplied with the refrigerant. The inflowed outside air is converted into the high temperature state while passing through the heater 52a and inflows to the vehicle interior, realizing the heating of the vehicle interior.

That is, the heat pump system according to the exemplary embodiment of the present invention absorbs the external heat together with the waste heat of the battery module 26 when the heating is required during the initial driving of the vehicle in which the waste heat of the electrical component 15 is insufficient by use of it to raise the temperature of the refrigerant, reducing the power consumption of the compressor 59 and improving the heating efficiency.

In the exemplary embodiment of the present invention, the operation for the case of performing the heating mode of the vehicle by use of the waste heat of the electrical component 15 is described with reference to FIG. 6.

Figure 6:
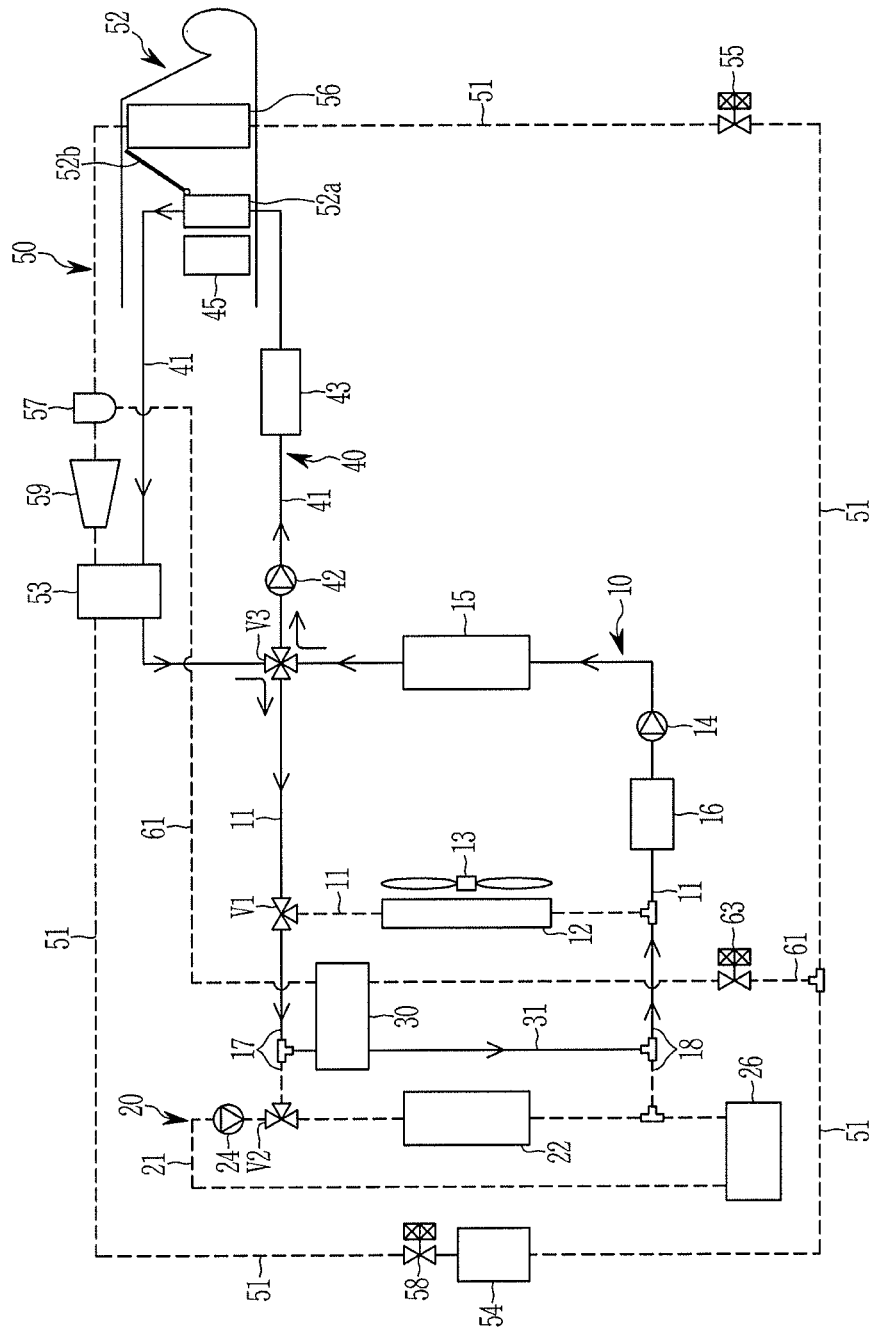
FIG. 6 is an operational state diagram of a heating mode of a vehicle by use of waste heat of an electrical component in a heat pump system for a vehicle according to an exemplary embodiment of the present invention.

FIG. 6 is an operational state diagram of a heating mode of a vehicle by use of waste heat of an electrical component in a heat pump system for a vehicle according to an exemplary embodiment of the present invention.

Referring to FIG. 6, the heat pump system may recover the waste heat of the electrical component 15 and the motor to be used to the internal heating when the waste heat of the electrical component 15 and the motor is sufficient.

First, in the cooling apparatus 10, the coolant line 11 and the first connection line 17, the second connection line 18, and the branch line 31 are connected through operation of the first valve V1.

In the present state, the coolant having passed through the electrical component 15 may be continuously circulated along the coolant line 11, the first connection line 17, the second connection line 18, and the branch line 31 through operation of the first water pump 14 without passing through the radiator 12.

This operation may allow the coolant to absorb the waste heat from the electrical component 15 and raise the temperature.

In the heating apparatus 40, the coolant line 11 and the heating line 41 are connected through operation of the third valve V3.

Thus, in the cooling apparatus 10, the coolant whose temperature is raised by the waste heat of the electrical component 15 is supplied to the heater 52a through operation of the third water pump 42 while circulating through the heating line 41.

On the other hand, in the battery cooling apparatus 20, as the operation of the second water pump 26 is stopped, the circulation of the coolant is stopped. Simultaneously, in the air conditioner 50, the circulation of the refrigerant stops as the operation of the compressor 59 stops.

Here, the coolant heater 43 is operated when the temperature of the coolant circulating along the heating line 41 is lower than the target temperature, so that the coolant circulating in the heating line 41 may be heated.

Further, when the air heater 45 is applied in place of the coolant heater 43, the air heater 45 is operated when the temperature of the outside air passing through the heater 52a is lower than the target temperature such that the outside air inflowed to the vehicle interior may be heated.

As a result, the outside air flows into the internal in an uncooled temperature state when passing through the evaporator 56, which is not supplied with the refrigerant. The inflowed outside air is converted into the high temperature state while passing through the heater 52a and inflowed to the vehicle interior, realizing the heating of the vehicle interior.

That is, in the state that the waste heat of the electrical component 15 is sufficient, when the heating is required, the heat pump system according to the exemplary embodiment of the present invention may increase the temperature of the coolant by use of the waste heat of the electrical component 15 and heat the vehicle interior with the coolant with the increased temperature.

On the other hand, in the exemplary embodiment of the present invention, the exemplary embodiment in which the coolant passing through the electrical component 15 does not pass through the radiator 12 is described, however it is not limited thereto.

That is, when the electrical component 15 is overheated, some of the coolant passing through the electrical component 15 may pass through the radiator 12 through operation of the first valve V1, preventing the electrical component 15 from overheating.

In the exemplary embodiment of the present invention, the operation for the case of recovering the waste heat of the electrical component 15 depending on the heating/dehumidification mode of the vehicle is described with reference to FIG. 7.

Figure 7:
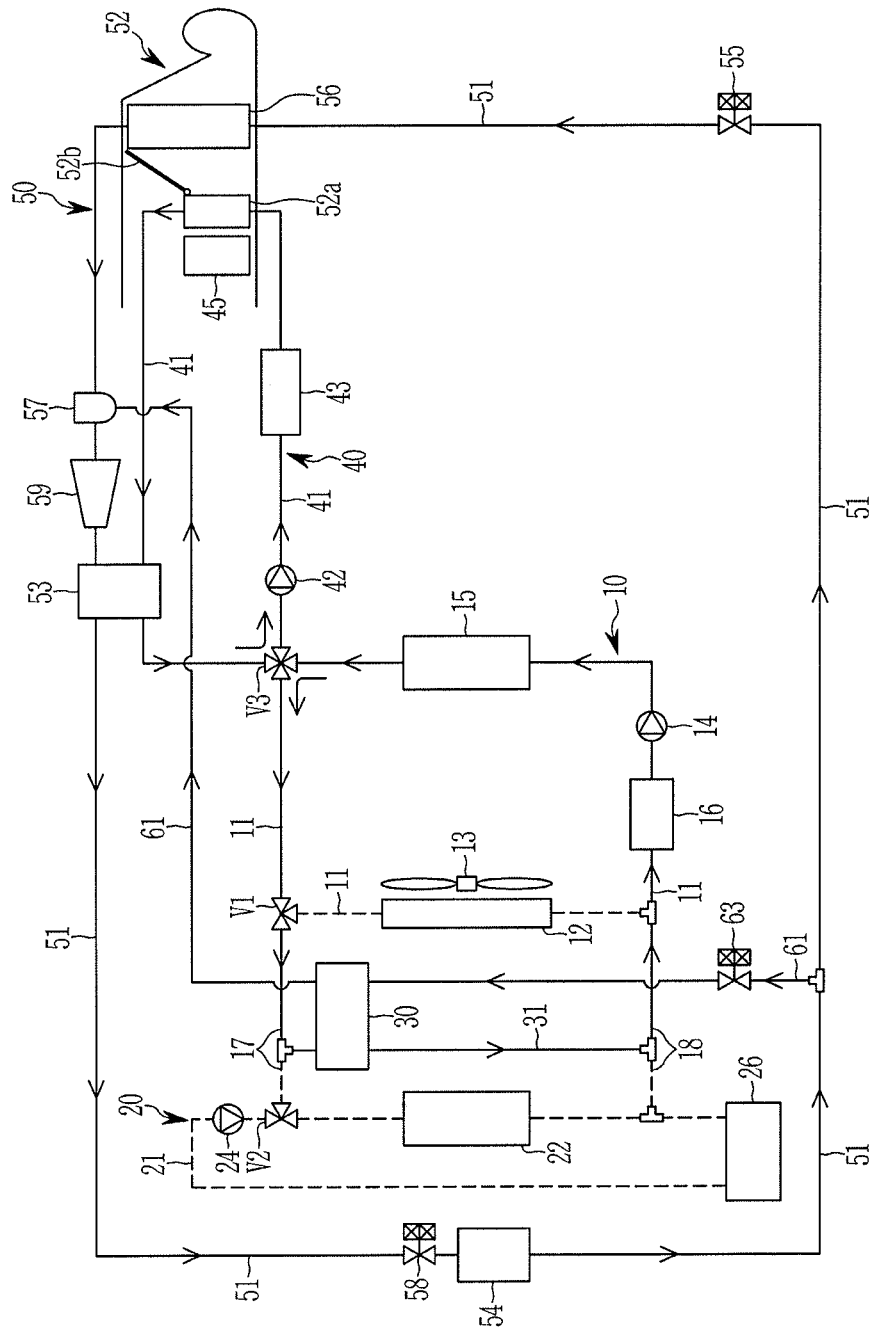
FIG. 7 is an operational state diagram for a heating/dehumidification mode in a heat pump system for a vehicle according to an exemplary embodiment of the present invention.

FIG. 7 is an operational state diagram for a heating/dehumidification mode in a heat pump system for a vehicle according to an exemplary embodiment of the present invention.

Referring to FIG. 7, the heat pump system may recover the waste heat of the electrical component 15 in the heating/dehumidification mode of the vehicle to use the internal heating.

Here, when the temperature of the vehicle interior is a low temperature, the heat pump system may recover the external heat along with the waste heat of the electrical component 15, whereas, when the temperature of the vehicle interior is a high temperature, it may only recover the waste heat of the electrical component 15 to use in the internal heating of the vehicle.

First, in the cooling apparatus 10, the coolant line 11 and the first connection line 17, the second connection line 18, and the branch line 31 are connected through operation of the first valve V1. In the instant state, the coolant passing through the electrical component 15 may be supplied to the chiller 30 without passage through the radiator 12 through operation of the first water pump 14.

That is, in the cooling apparatus 10, the opened branch line 31 and the first and second connection lines 17 and 18 are connected to the coolant line 11.

Accordingly, the coolant passing through the electrical component 15 is continuously circulated along the coolant line 11, the first and second connection lines 17 and 18, and the branch line 31 without the passage through the radiator 12, and absorbs the waste heat from the electrical component 15 such that the temperature is increased.

The coolant with the increased temperature may be supplied to the chiller 30. That is, the waste heat generated by the electrical component 15 raises the temperature of the coolant circulating through the coolant line 11.

Meanwhile, the battery cooling apparatus 20 is shut downwards.

In the heating apparatus 40, the coolant circulates along the heating line 41 through operation of the third water pump 42.

On the other hand, the coolant line 11 and the heating line 41 may form the independent closed circuit through operation of the third valve V3.

Thus, the coolant circulating through the heating line 41 may be supplied to the condenser 53 after passing through the heater 52a through operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 is operated when the temperature of the outside air passing through the heater 52a is lower than the target temperature, the outside air inflowed to the vehicle interior may be heated.

In the air conditioner 50, each constituent element operates to heat the vehicle interior. Thus, the refrigerant circulates along the refrigerant line 51.

Here, the refrigerant line 51 connecting the condenser 53 and the evaporator 56 is opened though the operation of the first expansion valve 55.

The refrigerant connection line 61 is opened through operation of the second expansion valve 63.

Here, the first and second expansion valves 55 and 63 may expand the refrigerant supplied to the refrigerant connection line 61 and the refrigerant line 51 from the heat exchanger 54 so that the expanded coolant is supplied to the evaporator 56 and the chiller 30.

Further, when the temperature of the vehicle interior is low, the third expansion valve 58 may expand the refrigerant supplied from the condenser 53 to be inflowed to the heat exchanger 54.

Accordingly, the heat exchanger 54 recovers the external heat while evaporating the expanded coolant through the heat exchange with the outside air.

Conversely, the third expansion valve 58 may inflow the refrigerant supplied from the condenser 53 to the heat exchanger 54 without expanding when the temperature of the vehicle interior is high.

Accordingly, the heat exchanger 54 may condense the refrigerant through heat exchange with the outside air.

Also, the coolant of which the temperature is increased by absorbing the waste heat of the electrical component 15 is recovered while increasing the temperature of the refrigerant supplied to the chiller 30 while passing through the chiller 30 through operation of the first water pump 14.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the electrical component 15, recovering the waste heat of the electrical component 15.

Next, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed from the compressor 59 with the high temperature high pressure inflows to the condenser 53.

Here, the refrigerant supplied to the condenser 53 may increase the temperature of the coolant by exchanging heat with the coolant circulating through the heating line 41. The coolant with raised temperature is supplied to the heater 52a.

On the other hand, the expanded refrigerant supplied to the evaporator 56 though the operation of the first expansion valve 55 exchanges heat with the outside air passing through the evaporator 56, and is then supplied to the compressor 59 through the accumulator 57 along the refrigerant line 51.

That is, the refrigerant passing through the evaporator 56 may be supplied to the compressor 59 along with the refrigerant inflowed to the accumulator 57 through the refrigerant connection line 61.

The refrigerant compressed by the compressor 59 with high temperature and high pressure is then inflowed to the condenser 53.

Here, the door 52b is opened so that the outside air inflowed to the HVAC module 52 and passing through the evaporator 56 passes through the heater 52a.

That is, the outside air inflowed to the HVAC module 52 is dehumidified while passing through the evaporator 56 by the refrigerant of the low temperature state inflowed to the evaporator 56. Next, the outside air is converted into a high temperature state while passing through the heater 52a and inflowing to the vehicle interior, heating and dehumidifying the interior of the vehicle.

That is, the heat pump system according to the exemplary embodiment of the present invention selectively absorbs the external heat depending on the internal temperature of the vehicle along with the waste heat generated from the electrical component 15 in the heating/dehumidification mode of the vehicle by being used to increase the temperature of the refrigerant, reducing the power consumption of the compressor 59 and improving the heating efficiency.

Next, the operation for the case of increasing the temperature of the battery module 26 is described with reference to FIG. 8.

Figure 8:
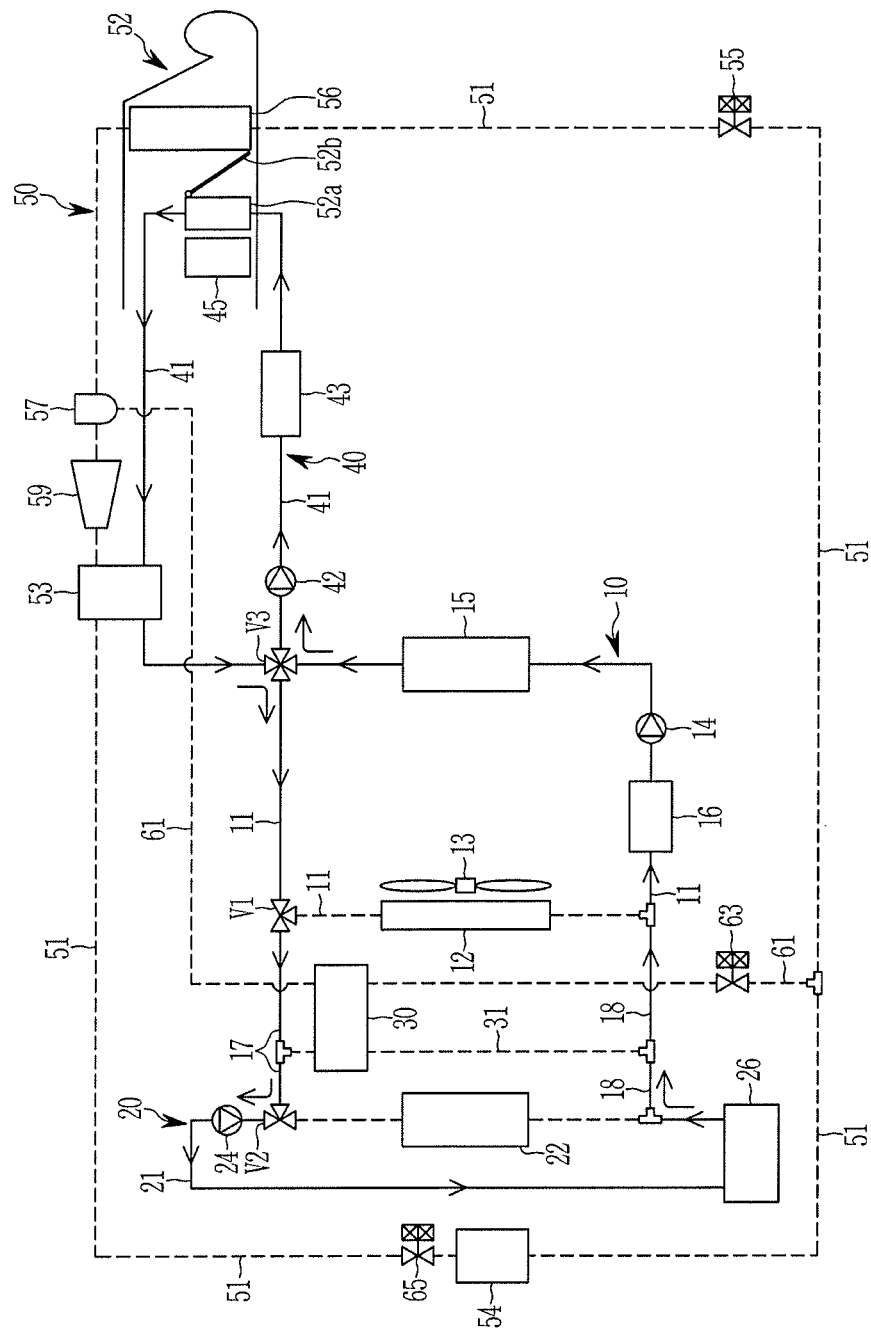
FIG. 8 is an operational state diagram for heating of a battery module in a heat pump system for a vehicle according to an exemplary embodiment of the present invention.

FIG. 8 is an operational state diagram for heating of a battery module in a heat pump system for a vehicle according to an exemplary embodiment of the present invention.

Referring to FIG. 8, the heat pump system may heat the battery module 26 by recovering the waste heat of the electrical component 15.

First, the coolant line 11 and the battery coolant line 21 are connected to the first and second connection lines 17 and 18 through operation of the first valve V1 and the second valve V2. Here, the branch line 31 is closed.

Thus, the cooling apparatus 10 and the battery cooling apparatus 20 may form one independent closed circuit in which the coolant line 11 and the battery coolant line 21 are connected via the first and second connection lines 17 and 18.

Here, the second water pump 24 is deactivated, and the coolant that passes through the electrical component 15 through operation of the first water pump 14 may be supplied to the battery module 26 without passing through the radiator 12 and the battery radiator 22.

In the heating apparatus 40, the coolant line 11 and the heating line 41 are connected through operation of the third valve V3. Accordingly, the coolant with the increased temperature by the waste heat of the electrical component 15 in the cooling apparatus 11 may circulate through the heating line 41 through operation of the third water pump V3.

The air conditioner 50 is shut down.

That is, the coolant with the increased temperature while passing through the electrical component 15 may be supplied to the battery module 26 without passing through the radiator 12 and the battery radiator 22, rapidly raising the temperature of the battery module 26.

Here, when the waste heat of the electrical component 15 is insufficient, the coolant heater 43 may heat the coolant circulating in the heating line 41 to raise the temperature.

The coolant having the increased temperature at the heating apparatus 40 is supplied to the battery module 26 by sequentially passing through the heating line 41, the coolant line 11, the first connection line 17, and the battery coolant line 21, further rapidly raising the temperature of the battery module 26.

Thus, if the heat pump system for the vehicle according to an exemplary embodiment of the present invention as described above is applied, by use of one battery chiller 30, in which the refrigerant and the coolant are heat exchanged to heat or cool the battery module 26 depending on the mode of the vehicle, the heating apparatus 40 implements the heating mode of the vehicle using the coolant, simplifying the system.

Also, by efficiently heating and cooling the battery module 26 to be suitable for the mode of the vehicle in an exemplary embodiment of the present invention, optimal performance of the battery module 26 is enabled and the overall travel distance of the vehicle may be increased through the efficient management of the battery module 26.

Furthermore, the present invention selectively utilizes the external heat and the waste heat of the electrical component 15 and the battery module 26 in the heating mode of the vehicle, improving the heating efficiency.

The present invention also improves the condensing or evaporation performance of the refrigerant by use of the condenser 53 and the heat exchanger 54, improving the cooling performance and reducing the power consumption of the compressor 59.

In an exemplary embodiment of the present invention, a controller is connected to the heat pump system, e.g., the first valve, V1, the second valve V2, and the third V3 so as to operate the heat pump system. The controller may be at least one microprocessor operated by a predetermined program which may include a series of commands control the heat pump system in accordance with various exemplary embodiments of the present invention.

Furthermore, the present invention may reduce production cost and weight and improve space utilization by simplifying the entire system.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the system comprising:
   a cooling apparatus including a radiator, a first water pump, and a first valve, which are connected by a coolant line, and for circulating a coolant through the coolant line to cool at least one electrical component mounted on the coolant line;
   a battery cooling apparatus including a battery radiator, a second water pump, and a second valve, which are connected by a battery coolant line, and for circulating a coolant through a battery module mounted on the battery coolant line;
   a heating apparatus including a heating line connected to the coolant line through a third valve to heat a vehicle interior by use of a coolant and a third water pump mounted on the heating line, and a heater; and
   a chiller mounted on a branch line connecting a first connection line and a second connection line connected through the first valve and the second valve to selectively pass a coolant supplied from the cooling apparatus or the battery cooling apparatus to the branch line, connected to a refrigerant line of an air conditioner through a refrigerant connection line, and to selectively heat-exchange inflowed coolant with a refrigerant supplied from the air conditioner to adjust a temperature of the coolant,
   wherein a condenser of the air conditioner is connected to the refrigerant line of the air conditioner to pass the refrigerant supplied from the air conditioner through the condenser and to the heating line to pass the coolant circulating through the heating apparatus through the condenser.

2. The heat pump system for the vehicle of claim 1, wherein the air conditioner further includes:
   a heating, ventilation, and air conditioning (HVAC) module including an evaporator connected through the refrigerant line and a door, operation of which is adjustable so that outside air passing through the evaporator selectively inflows to the heater depending on cooling, heating, and dehumidification modes;
   a compressor connected through the refrigerant line between the evaporator and the condenser;
   a heat exchanger mounted on the refrigerant line between the condenser and the evaporator;
   a first expansion valve mounted on the refrigerant line between the heat exchanger and the evaporator;
   a second expansion valve mounted on the refrigerant connection line;
   an accumulator mounted on the refrigerant line between the evaporator and the compressor and connected to the refrigerant connection line; and
   a third expansion valve mounted on the refrigerant line between the condenser and the heat exchanger.

3. The heat pump system for the vehicle of claim 2, wherein the heat exchanger condenses or evaporates the refrigerant condensed in the condenser through heat exchange with the outside air depending on a selective operation of the third expansion valve.

4. The heat pump system for the vehicle of claim 2, wherein the second expansion valve expands the refrigerant inflowed through the refrigerant connection line to flow to the chiller when cooling the battery module by the refrigerant.

5. The heat pump system for the vehicle of claim 2, wherein the third expansion valve selectively expands the refrigerant inflowed to the heat exchanger in the heating mode and the heating/dehumidification mode of the vehicle.

6. The heat pump system for the vehicle of claim 2, wherein the HVAC module further includes an air heater mounted on a rear of the heater toward an interior of the vehicle to selectively heat the outside air passing through the heater.

7. The heat pump system for the vehicle of claim 2, wherein a first end portion of the refrigerant connection line is connected to the refrigerant line between the heat exchanger and the first expansion valve, and
   wherein a second end portion of the refrigerant connection line is connected to the accumulator.

8. The heat pump system for the vehicle of claim 2, wherein the battery radiator is mounted on a front of the radiator at a front of the vehicle, and
   wherein the heat exchanger is mounted on a front of the battery radiator.

9. The heat pump system for the vehicle of claim 2, wherein a first end portion of the first connection line is connected to the coolant line through the first valve, a second end portion of the first connection line is connected to the battery coolant line through the second valve,
   wherein the second connection line connects the coolant line and the battery coolant line at a position separated from the first connection line via the radiator and the battery radiator, and
   wherein the first and second connection lines are selectively connectable through the coolant line, or the battery coolant line and the branch line according to operation of the first and second valves, respectively.

10. The heat pump system for the vehicle of claim 9, wherein
    when cooling the at least one electrical component and the battery module by use of each coolant cooled in the radiator and the battery coolant line,
    the first and second connection lines and the branch line are closed through operation of the first and second valves, and
    the cooling apparatus and the battery cooling apparatus respectively form an independent closed circuit and respectively circulate the coolant through the at least one electrical component and the battery module through operation of the first and second water pumps.

11. The heat pump system for the vehicle of claim 9, wherein
    when cooling the battery module in the cooling mode of the vehicle,
    in the cooling apparatus, connection of the coolant line and the first connection line is closed through operation of the first valve, the coolant cooled in the radiator circulates the at least one electrical component through operation of the first water pump,
    in the battery cooling apparatus, the battery coolant line and the first connection line, the second connection line, and the branch line are connected through operation of the second valve, the coolant passing through the chiller is supplied to the battery module without passing through the battery radiator through operation of the second water pump,
    in the heating apparatus, the coolant line and the heating line are connected through operation of the third valve so that the coolant is supplied from the cooling apparatus, in the air conditioner, in a state that the refrigerant connection line is opened through operation of the second expansion valve, the refrigerant circulates along the refrigerant line and the refrigerant connection line, the first and second expansion valves expand the refrigerant so that the expanded refrigerant is supplied to the evaporator and the chiller, respectively, and the third expansion valve inflows in the refrigerant supplied from the condenser to the heat exchanger.

12. The heat pump system for the vehicle of claim 11, wherein the heating apparatus supplies the coolant supplied from the cooling apparatus through operation of the third water pump to the condenser, and wherein the condenser condenses the refrigerant through heat exchange with the coolant, and the heat exchanger condenses the refrigerant inflowed from the condenser through heat exchange with the outside air.

13. The heat pump system for the vehicle of claim 9, wherein when recovering waste heat of an external heat source and the at least one electrical component in the heating mode of the vehicle, in the cooling apparatus, the coolant line and the first connection line, the second connection line, and the branch line are connected through operation of the first valve, the coolant passing through the at least one electrical component is supplied to the chiller without passing through the radiator through operation of the first water pump, the coolant line and the heating line respectively form an independent closed circuit through operation of the third valve, in the heating apparatus, the coolant circulates along the heating line through operation of the third water pump, in the air conditioner, the refrigerant line connecting the condenser and the evaporator is closed through operation of the first expansion valve, the refrigerant connection line is opened through operation of the second expansion valve, the second expansion valve expands the refrigerant supplied to the refrigerant connection line to be supplied to the chiller, and the third expansion valve expands the refrigerant supplied from the condenser to be supplied to the heat exchanger.

14. The heat pump system for the vehicle of claim 9, wherein when recovering waste heat of an external heat source and the battery module in the heating mode of the vehicle, in the battery cooling apparatus, the battery coolant line and the first connection line, the second connection line, and the branch line are connected through operation of the second valve, the coolant passing through the battery module is supplied to the chiller without passing through the battery radiator through operation of the second water pump, in the heating apparatus, connection of the coolant line and the heating line is closed through operation of the third valve, the coolant circulates through the heating line through operation of the third water pump, in the air conditioner, the refrigerant line connecting the condenser and the evaporator is closed through operation of the first expansion valve, the refrigerant connection line is opened through operation of the second expansion valve, the second expansion valve expands the refrigerant supplied to the refrigerant connection line to be supplied to the chiller, and the third expansion valve expands the refrigerant supplied from the condenser to be supplied to the heat exchanger.

15. The heat pump system for the vehicle of claim 9, wherein when performing the heating mode of the vehicle by use of waste heat of the electrical component, in the cooling apparatus, the coolant line and the first connection line, the second connection line, and the branch line are connected through operation of the first valve, the coolant passing through the at least one electrical component circulates through the coolant line and the first connection line, the second connection line, and the branch line without passing through the radiator through operation of the first water pump, in the heating apparatus, the coolant line and the heating line are connected through operation of the third valve, in the cooling apparatus, the coolant with the temperature increased by the waste heat of the at least one electrical component circulates through the heating line through operation of the third water pump, and operation of the battery cooling apparatus and the air conditioner is stopped.

16. The heat pump system for the vehicle of claim 9, wherein in the heating/dehumidification mode of the vehicle, in the cooling apparatus, the coolant line and the first connection line, the second connection line, and the branch line are connected through operation of the first valve, the coolant passing through the at least one electrical component is supplied to the chiller without passing through the radiator through operation of the first water pump, the coolant line and the heating line respectively form an independent closed circuit through operation of the third valve, in the heating apparatus, the coolant circulates along the heating line through operation of the third water pump, the coolant line and the heating line respectively form an independent closed circuit through operation of the third valve, in the heating apparatus, the coolant circulates along the heating line through operation of the third water pump, in the heating apparatus, the coolant line and the heating line are connected through operation of the third valve such that the coolant is supplied from the cooling apparatus, in the air conditioner, in a state that the refrigerant connection line is opened through operation of the second expansion valve, the refrigerant circulates along the refrigerant line and the refrigerant connection line, and the first and second expansion valves expand the refrigerant so that the expanded coolant is respectively supplied to the evaporator and the chiller.

17. The heat pump system for the vehicle of claim 16, wherein the third expansion valve expands the refrigerant supplied from the condenser to be inflowed to the heat exchanger when temperature of the vehicle interior is lower than a predetermined value, and when the temperature of the vehicle interior is higher than the predetermined value, the refrigerant supplied from the condenser is inflowed to the heat exchanger without the expanded state.

18. The heat pump system for the vehicle of claim 9, wherein
when increasing temperature of the battery module,
the coolant line and the battery coolant line are connected to the first and second connection lines through operation of the first valve and the second valve, and the branch line is closed,
in a state that operation of the second water pump is stopped, the coolant passing through the at least one electrical component is supplied to the battery module without passing the radiator and the battery radiator through operation of the first water pump,
in the heating apparatus, the coolant line and the heating line are connected through operation of the third valve, in the cooling apparatus, the coolant with the temperature increased by waste heat of the at least one electrical component circulates through the heating line through operation of the third water pump, and
operation of the air conditioner is stopped.

19. The heat pump system for the vehicle of claim 2, wherein the first, second, and third expansion valves are electrical expansion valves selectively expanding the refrigerant while controlling a flow of the refrigerant passing through the refrigerant line, or the refrigerant connection line.

20. The heat pump system for the vehicle of claim 1, wherein
in the heating line between the third water pump and the heater, a coolant heater to selectively heat the coolant is provided.

* * * * *